June 1, 1965 W. A. BARRETT, JR 3,187,324

MAGNETIC ANALOG-TO-DIGITAL ENCODER

Filed Nov. 21, 1961 3 Sheets-Sheet 1

INVENTOR
W. A. BARRETT, JR.
BY Lucian C. Canepa
ATTORNEY

INVENTOR
W. A. BARRETT, JR.
BY Lucian C. Canepa
ATTORNEY

MAGNETIC ANALOG-TO-DIGITAL ENCODER

Filed Nov. 21, 1961

INVENTOR
W. A. BARRETT, JR.
BY Lucian C. Canepa
ATTORNEY

United States Patent Office 3,187,324

Patented June 1, 1965

3,187,324

MAGNETIC ANALOG-TO-DIGITAL ENCODER

William A. Barrett, Jr., Chatham, N.J., assignor to Bell Telephone Laboratories, Incorporated, New York, N.Y., a corporation of New York Filed Nov. 21, 1961, Ser. No. 153,922

14 Claims. (Cl. 340—347)

This invention relates to data conversion circuitry and, more particularly, to a magnetic analog-to-digital encoder.

Electrical circuits capable of converting and encoding a continuous or analog input signal into a quantized or digital output are well known. One well known type of such a converter-encoder employs a plurality of nonlinear devices or switching elements wherein each is set to respond to a particular amplitude range or threshold of the analog signal. Complex electrical waveforms of amplitude greater than this threshold will cause selected ones of the nonlinear devices to switch states, while signals below the critical level produce no appreciable changes in the conditions of the elements. Typically, sensing elements responsive to the conditions of individual switching elements are interrogated at sequential intervals, and the information so obtained is used as inputs for further encoding logic stages. The resulting digital output from these encoding logic stages is representative of the instantaneous magnitude of the analog signal at the time the sensing elements were last interrogated. This digital information may then be handled with the greater speed and facility which characterizes digital information processing systems over the equivalent analog systems.

Various prior art embodiments of encoders employ biased diodes, magnetic cores, transistors and cathode ray tubes, among others, as the nonlinear elements and, typically, diode-transistor arrangements for the encoding logic circuitry.

An object of this invention is the improvement of data conversion circuits. More specifically, an object is to provide a new and improved analog-to-digital encoder.

Another object of this invention is to provide a unitary circuit arrangement which functions to both convert and encode an analog signal into digital form.

Another object is to provide an encoder which is both accurate and reliable.

A further object of this invention is to provide an analog-to-digital encoder which is simply constructed, flexible in application and capable of a rapid cycling time.

The foregoing and other objects of this invention are realized in one specific illustrative embodiment thereof which comprises a plurality of twistor wires employed as switching elements. The theory and operation of these twistors is described in detail in an application of A. H. Bobeck, Serial No. 675,522, filed August 1, 1957, now Patent No. 3,083,353, issued March 26, 1963. Briefly, the twistor comprises a sense lead around which, and inductively coupled thereto, is wrapped a ferromagnetic strip of material creating a plurality of localized saturable magnetic switching regions. The twistor wires are, in general, subdivided into a plurality of different sections each of which contains a plurality of localized switching regions which are operationally identical.

In accordance with the principles of the present invention, each section of each twistor wire has inductively coupled thereto a biasing conducting sheet, an analog signal winding and a reset pulse winding. The reset winding and the analog signal winding are further connected to reset pulse and analog signal current sources, respectively. The biasing conducting sheets coupled to the various twistor wire sections are of equal overall lengths but are divided into a different number of segments which, in turn, are all serially connected together, and further connected in series with a source of constant biasing current.

The current supplied by the biasing source flows through the conducting sheets and creates different current density vector components in the segments of the conducting sheets in a direction orthogonal to the axis of the associated twistor section. This current in the conducting sheets generates a plurality of magnetic biasing fields, each of a unique magnitude, which biases the twistor sections coupled thereto to different points on their hysteresis curves. On any one particular twistor wire the bias is so arranged that adjacent sections are biased in alternating polarities and with increasing magnitudes of magnetizing force. The number of sections employed, and the strength of the biasing field applied thereto, are dependent upon the specific logic encoding desired.

A complex analog input current waveform is applied to the input winding which is coupled to each twistor section in a sense opposite to the bias flux. Since each of the sections is differently biased on its hysteresis curve, each section responds to a particular minimum threshold of signal amplitude by switching its saturation flux orientation. A periodic reset pulse applied to the reset circuit, and hence to the reset winding, is of sufficient magnitude to reset to their original flux orientations all of the twistor sections which may have been switched by the signal current. Each section of a twistor wire thereby reset induces a voltage in the sense lead contained in the associated twistor wire. Because the adjacent sections are biased with fields of an increasing magnitude and in alternating polarities, each sense lead will have either cancelling signals induced therein by an even number of switched adjacent sections, or a net positive signal corresponding to the switching of an odd number of adjacent sections.

The signals appearing at the terminals of the sense leads are representative of the instantaneous magnitude of the input signal at the time of the last interrogation by the reset source. These output signals may be further processed by an integrating network or a zero-order hold circuit, both well known in the art, to produce a substantially rectangular output whose voltage magnitude is proportional to the total flux switched in the twistor section, which may, therefore, contain a ferromagnetic wrapping possessing a hysteresis loop of arbitrary squareness.

Another embodiment to be described hereinafter also includes the employment of twistor wires as a switching means, and wire-wound solenoids as the magnetomotive biasing means. Circuit operation is similar to that of the other embodiment previously discussed.

It is, thus, one feature of the present invention that a magnetic analog-to-digital encoder include a plurality of twistor wires, some being subdivided into a plurality of sections, each section being inductively coupled to each of a magnetomotive biasing source, an analog signal source and a source of reset pulses.

It is another feature of this invention that a magnetic analog-to-digital encoder include a plurality of conducting sheets inductively coupled to twistor wires.

Another feature of this invention is that a magnetic analog-to-digital encoder include sections of a twistor wire which are biased to different points on their hysteresis curves both as to magnitude and polarity.

It is still another feature of this invention that a magnetic analog-to-digital encoder include a plurality of magnetic elements which are inductively coupled to each of a magnetomotive biasing source, a source of analog current signals, a source of reset pulses and an output sensing element, and that a plurality of output circuits be formed by serially connecting combinations of the output sensing elements, each of the output sensing elements being associated with one of the magnetic elements.

A complete understanding of the present invention and of the above and other features and advantages thereof may be gained from a consideration of the following detailed decription of two illustrative embodiments thereof presented hereinbelow in conjunction with the accompanying drawing, in which.

Figures 1, 2:
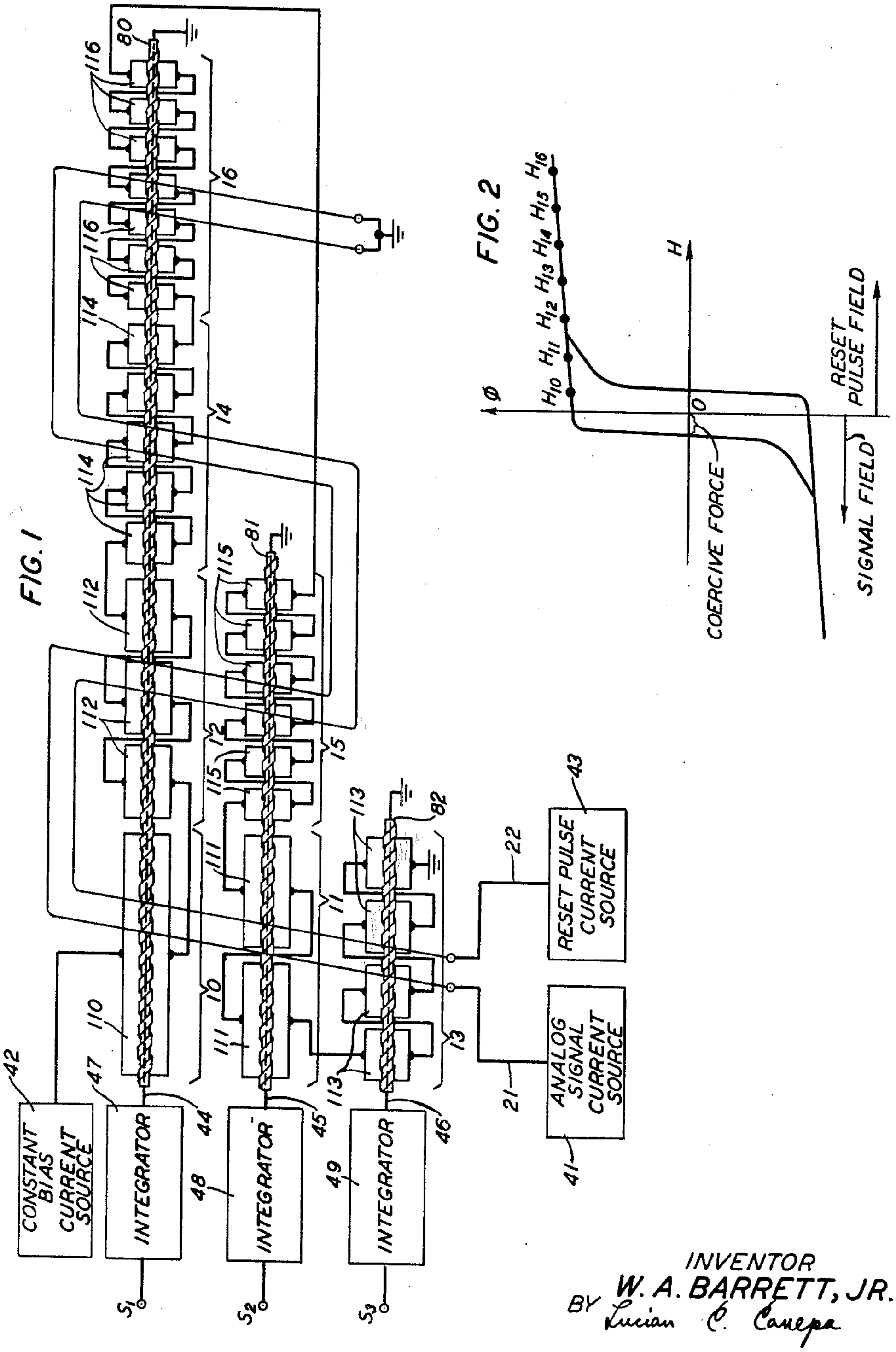
FIG. 1 is a schematic diagram of one specific illustrative magnetic analog-to-digital encoding circuit made in accordance with the principles of the present invention.
FIG. 2 is a typical hysteresis characteristic for the ferromagnetic wrapping of the twistor wires employed in FIG. 1 and has projected thereon various biasing drives for the sections of the twistor wires.

A first specific illustrative magnetic analog-to-digital encoder made in accordance with the principles of the present invention is shown in FIG. 1 and comprises three twistor wires 80–82 which are sub-divided into a plurality of switching sections 10–16 as illustrated. Each of the twistor sections 10–16 is inductively coupled to signal current winding 21, a reset pulse current winding 22 and one of the plurality of conducting bias sheets 110–116. The input winding 21 and the reset winding 22 are shown as linking only one turn with each twistor section for the sake of clarity and simplicity, but it should be understood that in general, a plurality of turns would be employed. The signal winding 21 and the reset winding 22 are grounded at one side and connected at the other to a specific current source. The signal winding 21 is connected at its other end to an analog input signal current source 41 which provides the complex analog current waveform which is to be converted to a coded form. The reset winding 22 is connected at its other end to a reset pulse current source 43 which provides recurrent current pulses of a polarity and magnitude discussed hereinafter. The conducting bias sheets 110–116, coupled to the sections 10–16, respectively, are divided into a plurality of conducting segments. Each of the sheet numbers 110–116 refers to the plurality of equal length sheet segments coupled to one specific twistor section, while biasing sheets of a different number contain segments of a different length. The segments of all the conducting sheets 110–116 are all serially interconnected and further connected in series with a source of constant biasing current 42, which provides a continuous constant current of a magnitude and poliarity also discussed hereinafter. Current sources of the character contemplated as comprising the sources 41, 42 and 43 are well known to one skilled in the art. Accordingly, these sources need not be described in detail.

The twistor wires 80–82 contain the sense leads 44, 45 and 46, which are grounded at one end and terminate at the other in integrators 47, 48 and 49, respectively, from which outputs $S_1$, $S_2$ and $S_3$ are derived. The integrating circuits employed may be of any conventional type well known in the art.

The twistor wire 80 is divided into four distinct switching sections 10, 12, 14 and 16 which are respectively coupled to the conducting sheets 110, 112, 114 and 116. Similarly, twistor wire 81 is sub-divided into switching sections 11 and 15, respectively, coupled to the conducting sheets 111 and 115, while the entire twistor wire 82 comprises switching section 13 and is coupled to the conducting sheet 113.

As was described above segments of the conducting sheets 110–116 are serially interconnected and also connected in series with the constant current source 42. An identical current $i_b$ supplied by the source 42 enters either the top or bottom of teach of these unequal length conducting sheet segments which are coupled to the different sections 10–16. This circuit arrangement produces a different current density component in the segments of each of the conducting sheets 110–116 in a direction orthogonal to the twistor sections 10–16. For example, the vertical component of the current density vector in each of the two segments of the conducting sheet 111 is twice as large as that contained in sheet 110 as an identical current is flowing in segments only one-half as large as the sheet 110. Similarly, each of the three segments of the conducting sheet 112 contains a vertical current density component three times as large as that contained in the sheet 110.

While the current is shown to be entering and leaving the center of each segment, this is not necessary in the practice of the present invention as the vector component orthogonal to the twistor wires 80–82 will bear the same integral multiple relationship independent of the displacement off center of the input and output current terminal provided both these terminals do not lie along the long axis of the twistor sections.

A plurality of horizontal, biasing magnetic fields are generated by the above-described biasing arrangement. These fields are proportional to the vertical components of the current density vectors in the sheet segments. Hence, the biasing magnetic fields coupled to the twistor sections are of different magnetizing force. Also, it is to be noted that the current flows in an alternating direction in sheets coupled to adjacent twistor sections. For example, examining the orientations of the magnetic fields coupled to the sections of twistor wire 80, it is seen that the sections 10 and 14 have a right to left field produced by the current flowing in a downward direction in the segments of the conducting sheets 110 and 114, while the sections 12 and 16 have a left to right field induced by current flowing upward through the segments of the biasing sheets 112 and 116. The twistor wire 81 similarly contains biasing fields of alternating polarities. Each of the sections 10–16 is therefore magnetically biased by the above-described conducting sheets 110–116 and current source 42 to the different points $H_{10}$–$H_{16}$, respectively, on their hysteresis curves, as shown in FIG. 2. All of the biasing operating points are indicated in the same magnetic state, as the relative directions of the bias, pulse field and signal fields are the same for every twistor section, although it is to be understood that the bias direction itself may take either one of the two possible orientations. Note that in every case, the signal field produced by the signal current winding 21 and the signal source 41 is of the opposite sense, and the reset field generated by the reset pulse current winding 22 and the reset source 43 is of the same sense, as that of the bias field. In addition, to be consistent with the magnetic field polarities described above, the sources 41 and 42 will henceforth be assumed to supply currents of one polarity, and the source 43 to supply a current of the opposite polarity.

Figure 3:
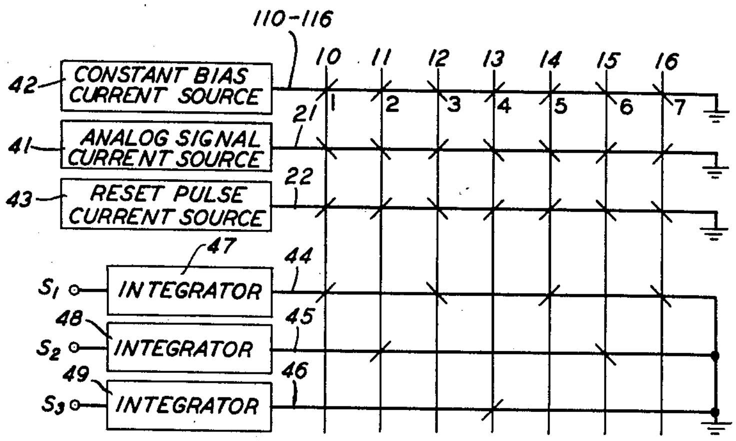
FIG. 3 is an equivalent electrical model for the circuit depicted in FIG. 1.

With the foregoing organization of this one embodiment of a magnetic analog-to-digital encoder in mind, the operation thereof may best be described by referring to FIG. 3. Each vertical line contained therein represents one of the twistor sections 10–16 as labeled, and the horizontal lines represent the conducting sheets 110–116, the signal winding 21, the reset winding 22 and the sense leads 44–46. Each slash mark at an intersection of the horizontal and vertical lines represents an inductive coupling to the section, all marks in the first and third quadrants being of one polarity, and all marks contained in the second and fourth quadrants being of the opposite polarity. Also, the numbers alongside the intersections with the biasing conducting sheets 110–116 indicate the relative magnitude of the bias fields on the respective sections. This is then another model for the circuit whose schematic diagram appears in FIG. 1.

To better describe the operation of the encoder, two random magnitudes of the analog signal are chosen. Assume, for example, that the anolog signal source 41 supplies a signal current $i_s$ such that $$2<\frac{i_s}{i_b}<3$$

this would indicate that the signal current $i_s$ would be sufficient to overcome the magnetic bias on the two least-biased twistor sections 10 and 11, thereby switching them to their other flux polarity while being insufficient to overcome the bias, and therefore insufficient to switch, the sections 12–16. To be more exact, the signal field will have to exceed the bias field by more than the coercive force to switch a section, but this will henceforth be neglected as it adds only a small constant correction factor.

At some later time the next regularly occurring reset current pulse $i_p$ generated by the reset pulse current source 43 appears. This current $i_p$ is of sufficient magnitude to reset any of the sections which may have been switched, in this case, the sections 10 and 11. As these twistor sections are reset to their original flux orientation, they induce an output voltage in their respective sense leads, while the other sections 12–16 generate only a small shuttle voltage which is henceforth assumed insignificant compared to that generated by the switched sections. Referring again to FIG. 3, note that the sections 10 and 11 are coupled to the sense leads 44 and 45, respectively. The voltages induced therein are fed to the integrators 47 and 48, generating rectangular voltages of equal magnitudes at output terminals $S_1$ and $S_2$, respectively. The output voltage appearing at terminal $S_3$, that is, the output of the integrator 49, is, of course, zero. This set of output voltages is illustrated in FIG. 4 for the appropriate assumed signal current to bias current ratio; that is, $$2<\frac{i_s}{i_b}<3$$

Figure 4:
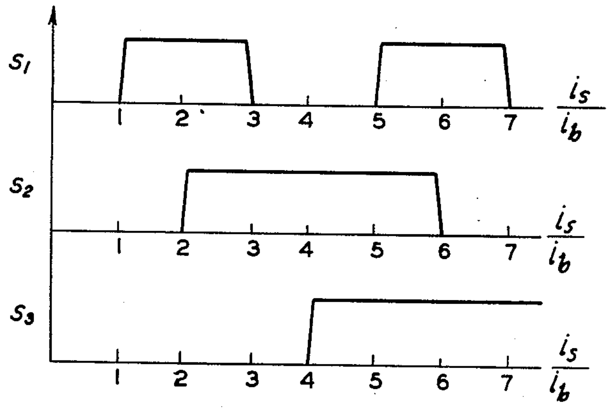
FIG. 4 illustrates the waveforms generated at the output of the circuit illustrated in FIG. 1 for various ratios of signal current to bias current.

It should be noted that FIG. 4 is a static characteristic, plotting output against the signal current to bias current ratio, rather than against time.

As a further example, assume the signal current $i_b$ is such that $$4<\frac{i_s}{i_b}<5$$

The signal current $i_s$ is now of sufficient magnitude to switch the sections 10–13, while not switching the sections 14–16. When the next regularly recurring reset pulse occurs, each of the twistor sections 10–13 is reset, thereby inducing an output voltage in their respective sense leads. Note that the sense lead 44 has both a positive signal from the section 10 and a negative signal from the section 12, which cancel, yielding no net signal in the output circuit 44 and therefore no voltage at the output of the integrator 47. Output circuits 45 and 46, however, both contain only one signal from the sections 11 and 13, respectively, and thus both the integrators 48 and 49 generate outputs. This set of voltages is also illustrated in FIG. 4 for $$4<\frac{i_s}{i_b}<5$$

Thus, the analog signal $i_b$ is supplied by analog signal source 41 is sampled at regularly recurring time intervals by the reset pulse source 43, and a binary representation of the magnitude of the signal $i_s$ automatically appears at the output terminals $S_1$, $S_2$ and $S_3$ in digital Gray-coded form. No additional external logic need be per-formed on the voltages contained in the individual sense leads 44–46.

Figure 6:
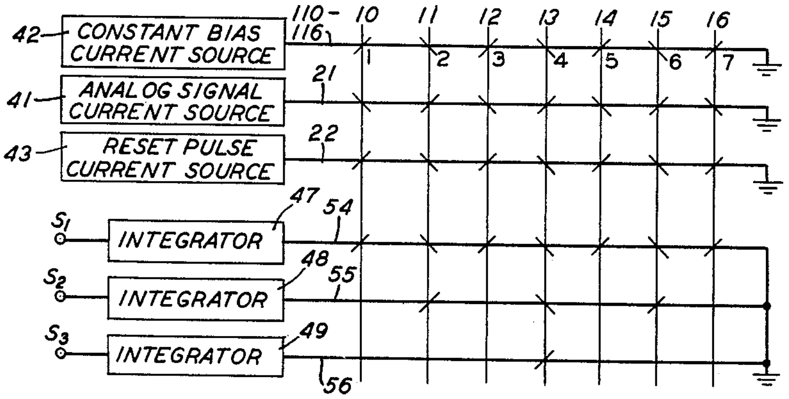
FIG. 6 is an equivalent model of a circuit similar to that illustrated in FIG. 1 wherein a straight binary code rather than a Gray code is generated.

The substitution of any other coding, for example, a straightforward binary counting code, for the Gray code previously employed, may be easily accomplished. Referring to FIG. 6, there is depicted therein a circuit model very similar to that just described in FIG. 3, except that a plurality of sense leads is included in every twistor wire, and therefore coupled to every twistor section container in the twistor wire. Note that the output circuit 54 comprises twistor leads coupled to all the twistor sections 10–16. Similarly, output circuits 55 and 56 are formed as illustrated in the figure. Note that a plurality of sense leads coupled to an individual section are used, with section 13, for example, now containing three sense leads as shown.

Figure 7:
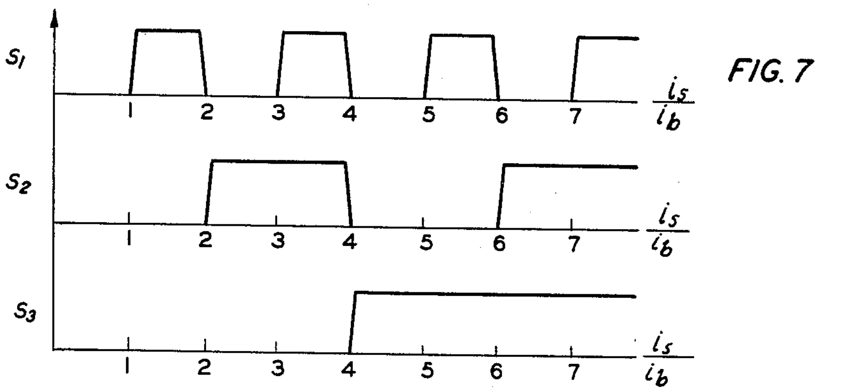
FIG. 7 illustrates the waveforms generated at the output leads of the circuit illustrated in FIG. 6 for various ratios of signal current to bias current.

By assuming various values of the signal current to bias current ratio, that is, $$\frac{i_s}{i_b}$$

and analyzing the circuit operation identically as described in detail above, the binary counting code illustrated in FIG. 7 would be shown as representing increasing values of the signal current to bias current ratio.

In summary, the circuit illustrated in FIG. 1 is capable, with suitable modifications in the sense lead combinations, of converting a unipolar analog signal to any desired binary encoding. Generalizing, it may be clearly seen that any alternating current analog signal may likewise be encoded by superimposing thereon a constant direct-current component greater than the maximum excursion of the alternating-current analog signal, so as to form a unipolar analog signal.

Also, the encoder as described above performs a linear encoding. Signal expansion or compression may readily be accomplished by suitably altering the magnetic biasing fields to no longer form integral multiples of the smallest field intensity. This may be done, for example, by making the total lengths of the conducting sheets 110–116 unequal.

Figure 5:
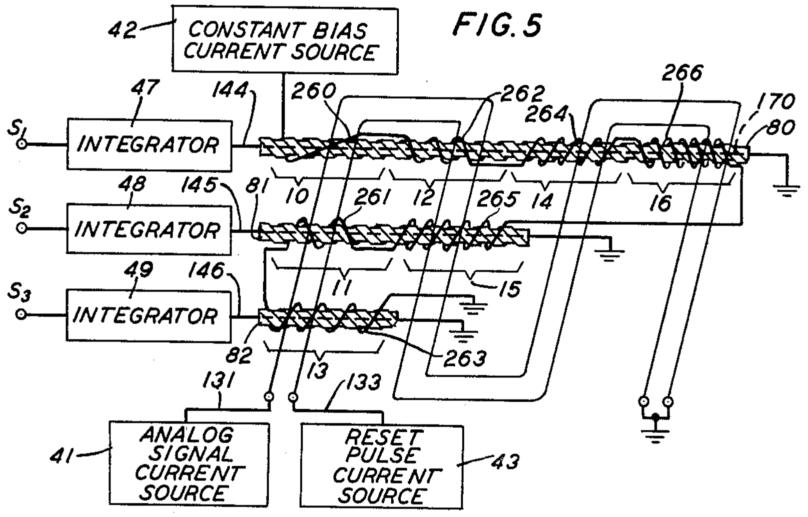
FIG. 5 is a schematic diagram of a second specific illustrative magnetic analog-to-digital encoding circuit made in accordance with the principles of the present invention.

A second embodiment of the present invention is illustrated in FIG. 5, wherein twistor wires are again employed as the switching means. The twistor sections 10–16, the analog signal current source 41 and winding 131, the integrators 47–49, and the reset pulse current source 43 and winding 133 are identical to those employed in the first embodiment. A different method, however, is used to generate the varying magnetomotive biasing fields for the twistor sections. In this embodiment, wire solenoids 260–266 are wound around each of the twistor sections 10–16, and carry an identical biasing current supplied by the constant biasing current source 42. These solenoids generate axial magnetic fields whose strength is proportional to the pitch of the windings, adjacent fields coupled to any one twistor wire being of opposite polarities. The pitch of the second solenoid 261 is twice that of the solenoid 260 and so on. Thus, the twistor switching sections 10–16 are biased in an identical manner as the embodiment previously presented, for example, the twistor wire 80 is coupled to the one and five relative strength solenoids 260 and 264 in one direction, and the three and seven relative strength solenoids 262 and 264 in the opposite direction. The other two twistor wires 81 and 82 are also coupled to an identical biasing field in identical polarities as in the conducting sheet embodiment. Circuit operation identically parallels the previous case, and therefore no further examples will be presented.

It should be recognized that the magnetic analog-to-digital encoder is not limited to twistor embodiments. Any general magnetic element, output windings and output circuits could be used for the ferromagnetic wrapping, localized regions of the sense leads and interconnection of the localized sense leads into the continuous sense leads, respectively.

To summarize the basic general concepts of the present invention with these analogies in mind, a plurality of magnetic elements are magnetically biased to different points on their hysteresis curves. The elements are further inductively coupled to each of an analog signal, reset pulses and an output sensing device, the analog signal being of an opposite polarity, and the reset pulses being of a like polarity, as the magnetic bias. Selected ones of the output sensing devices are connected into output circuits in alternating polarities.

Upon the occurrence of an analog signal, the magnetic switching elements whose biases are overcome switch their flux orientations, while the others produce only a small, negligible shuttle flux change. The next regularly recurring reset pulse resets those magnetic elements which were switched, thereby producing outputs in the individual output sensing devices. Output circuits with an odd number of activated sensing devices produce an output, while those with an even number do not. These signals may then be used, per se, as being representative of the instantaneous magnitude of the analog signal, or they may be further supplied to integrating networks, the outputs of which are essentially rectangular pulses.

By employing a plurality of output sensing devices on any one switching element, any desired encoding may be provided, while employing just one sensing device per switching element as described herein will result in a Gray code.

The above-described illustrative embodiments of this invention thus lend themselves to numerous and various modifications therein, each of which is understood to fall within the principles and scope of this invention. For example, the twistor sections 10–16 in FIG. 1 may be replaced by tensor wires, toroidal cores or closed or open magnetic structures of any design including any of the well known multiaperture magnetic structures such as transfluxors.

Also, each of the foregoing embodiments presented herein contains three output circuits and therefore a maximum of $2^3$, or eight, different binary representations. This was done only for simplicity of description, and it should be understood that any number of output circuits may be employed.

A thin film magnetic analog-to-digital encoder employing principles related to those described above is found in my copending application, Serial No. 153,921, filed concurrently herewith.

Therefore, it is to be understood that the above-described arrangements are only illustrative of the application of the principles of the present invention. Numerous other arrangements may be devised by those skilled in the art without departing from the spirit and scope of this invention.

For example, the twistor sections 10–16 may all be advantageously placed one under the other in which case the analog winding 21 and the reset winding 23 would each comprise one continuous winding around the twistor sections.

What is claimed is:

1. In combination in a magnetic analog-to-digital encoder, a plurality of magnetic elements each of arbitrary hysteresis characteristic, means for selectively biasing each of said magnetic elements to a different point on its hysteresis curve, means for applying equal analog flux drives to all of said elements in a sense opposite to the bias conditions thereon, means for simultaneously applying an equal reset flux pulse to each of said elements in the same sense as the applied bias to reset each of said elements, and a plurality of output means in one to one correspondence with said plurality of magnetic elements and responsive to a flux change in the corresponding one of said magnetic elements by having a voltage induced therein, selected combinations of said output means being serially interconnected in alternating polarities to form a plurality of output circuits.

2. A combination as in claim 1 wherein each of said plurality of magnetic elements comprises a section of the ferromagnetic wrapping of a twistor wire.

3. A combination as in claim 2 wherein said means for selectively biasing each of said magnetic elements to a different point on its hysteresis curve comprises a source of constant biasing current and a plurality of current-carrying conducting sheets, each of said plurality of conducting sheets including segments of an equal length and different ones of said sheets including segments of an unequal length, each of said conducting sheets being serially interconnected, said series connection further including said source of constant biasing current.

4. A combination as in claim 3 wherein said means for applying equal analog flux drives comprises a source of analog signal current and a winding, said winding being orthogonal to said twistor wires and inductively coupled thereto, and where said winding is serially connected to said source of analog signal current.

5. A combination as in claim 4 wherein said means for simultaneously applying equal reset flux pulses comprises a source of reset pulses and a reset winding, said winding being orthogonal to said twistor wires and inductively coupled thereto, said winding being serially connected to said source of reset pulses.

6. A combination as in claim 5 wherein said plurality of output circuits comprises a plurality of sense leads, said sense leads being in one to one correspondence with said twistor wires and contained therein, and where each of said output means comprises a localized segment of one of said sense leads.

7. A combination as in claim 2 wherein said means for selectively biasing each of said magnetic elements to a different point on its hysteresis curve comprises a source of constant biasing current and a plurality of wire-wound solenoids, each of said solenoids being characterized by a different pitch, each of the solenoids being serially interconnected and further connected in series with said source of constant biasing current.

8. A combination as in claim 7 wherein said means for applying equal analog flux drives comprises a source of analog signal current and a signal current winding, said winding being orthogonal to the twistor wires and inductively coupled thereto, said winding being serially connected to said source of analog signal current.

9. A combination as in claim 8 wherein said means for simultaneously applying equal reset flux pulses comprises a source of reset current pulses and a reset winding, said winding being orthogonal to said twistor wires and inductively coupled thereto, said winding being serially connected to said source of reset pulses.

10. In combination, a plurality of current-carrying sheets, a source of constant biasing current, and a plurality of twistor sections, each of said twistor sections being inductively coupled to at least one of said plurality of current-carrying sheets, said sheets being serially interconnected and further connected in series with said source of constant biasing current.

11. A combination as in claim 10 further comprising means for simultaneously applying an equal reset flux pulse to each of said twistor sections including a source of reset pulses and a reset pulse winding, said reset pulse winding being inductively coupled to each of said plurality of twistor sections and serially connected to said source of reset pulses such that the magnetic field produced by said reset pulse source and the magnetic bias produced by the current-carrying sheet coupled to each of said twistor sections are of a like polarity.

12. A combination as in claim 11 further including an analog signal current source, and an analog signal winding, said analog signal winding being inductively coupled to each of said plurality of twistor sections and serially connected to said analog signal current source such that the magnetic field produced by said analog signal current source and the magnetic bias produced by said current-carrying sheet coupled to each of said twistor sections are of opposite polarities.

13. A combination as in claim 12 further comprising a plurality of integrating networks, and a plurality of sense leads including in said plurality of twistor sections, each of said sense leads being grounded on one end and connected at the other to one of said plurality of integrating networks.

14. In combination in a magnetic analog-to-digital encoder, a plurality of magnetic switching elements, means responsive to an analog signal current by switching selected ones of said switching elements, means for simultaneously resetting each of said elements, output sensing means responsive to the resetting of each of said switching elements by having a voltage generated therein, and output circuits comprising the series connection in alternating polarities of selected ones of said output sensing means.

References Cited by the Examiner

UNITED STATES PATENTS

| | | | |
|---|---|---|---|
| 2,920,317 | 1/60 | Mallery | 340—174 |
| 3,000,004 | 9/61 | Weller | 340—174 |
| 3,045,230 | 7/62 | Tripp et al. | 340—347 |
| 3,050,713 | 8/62 | Harmon | 340—347 |

MALCOLM A. MORRISON, *Primary Examiner.*